(12) United States Patent
Wang et al.

(10) Patent No.: US 8,205,302 B2
(45) Date of Patent: Jun. 26, 2012

(54) HINGE ASSEMBLY

(75) Inventors: Jin-Xin Wang, Shenzhen (CN); Jian Li, Shenzhen (CN); Lian-Cheng Huang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 258 days.

(21) Appl. No.: 12/618,763

(22) Filed: Nov. 15, 2009

(65) Prior Publication Data

US 2011/0061201 A1 Mar. 17, 2011

(30) Foreign Application Priority Data

Sep. 11, 2009 (CN) .......................... 2009 1 0306914

(51) Int. Cl.
    *E05D 11/08* (2006.01)
(52) U.S. Cl. .......................................................... 16/342
(58) Field of Classification Search .................... 16/297, 16/299, 335, 337, 339, 355, 357, 360, 374, 16/286, 342; 361/679.08, 679.11, 679.02, 361/679.15, 679.27; 455/90.3, 575.1, 575.3, 455/575.8; 379/433.12, 433.13; 348/373, 348/333.01, 333.06, 794
See application file for complete search history.

(56) References Cited

U.S. PATENT DOCUMENTS

| | | | | |
|---|---|---|---|---|
| 4,489,974 A * | 12/1984 | Warhol | ........................ | 296/97.5 |
| 4,639,147 A * | 1/1987 | Schwarz | ....................... | 384/125 |
| 5,832,566 A * | 11/1998 | Quek et al. | ....................... | 16/342 |
| 5,918,348 A * | 7/1999 | Carpenter et al. | .............. | 16/342 |
| 6,085,388 A * | 7/2000 | Kaneko | ........................... | 16/338 |
| 6,386,528 B1 * | 5/2002 | Thorn et al. | ................... | 267/201 |
| 6,539,583 B1 * | 4/2003 | Uneme et al. | ................... | 16/342 |
| 6,671,927 B2 * | 1/2004 | Chen | ................................. | 16/339 |
| 6,817,064 B2 * | 11/2004 | Kim et al. | ....................... | 16/335 |
| 2003/0140457 A1* | 7/2003 | Kida | ............................... | 16/342 |
| 2007/0214605 A1* | 9/2007 | Tu | .................................. | 16/342 |

\* cited by examiner

*Primary Examiner* — Chuck Y. Mah
(74) *Attorney, Agent, or Firm* — Altis Law Group, Inc.

(57) ABSTRACT

A hinge assembly includes a shaft, a rotary member, and a tube. The rotary member includes a friction body and is fixed to the shaft. The tube rotatably engages with the friction body of the rotary member. When the tube rotates to a predetermined position relative to the rotary member, the friction body deforms, thereby generating friction between the friction body and the tube.

11 Claims, 4 Drawing Sheets

HINGE ASSEMBLY

BACKGROUND

1. Technical Field

The present disclosure generally relates to hinge assemblies, and particularly, to a self-retaining hinge assembly.

2. Description of Related Art

As consumer demand for portable electronic devices, such as mobile phones, to be progressively smaller and lighter, hinge assemblies applied therein must provide for the corresponding minimalization.

A frequently used hinge assembly includes a shaft, a friction member fixed on the shaft, a cam rotatably sleeved on the shaft, a cam follower non-rotatably sleeved on the shaft and engaging the cam, a friction member non-rotatable relative to the cam, and at least one resilient member sleeved on the shaft and resisting the cam towards the cam follower. However, such hinge assembly includes numerous components and is very complex, with high manufacturing costs.

Therefore, a hinge assembly is desired to overcome the described limitations.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
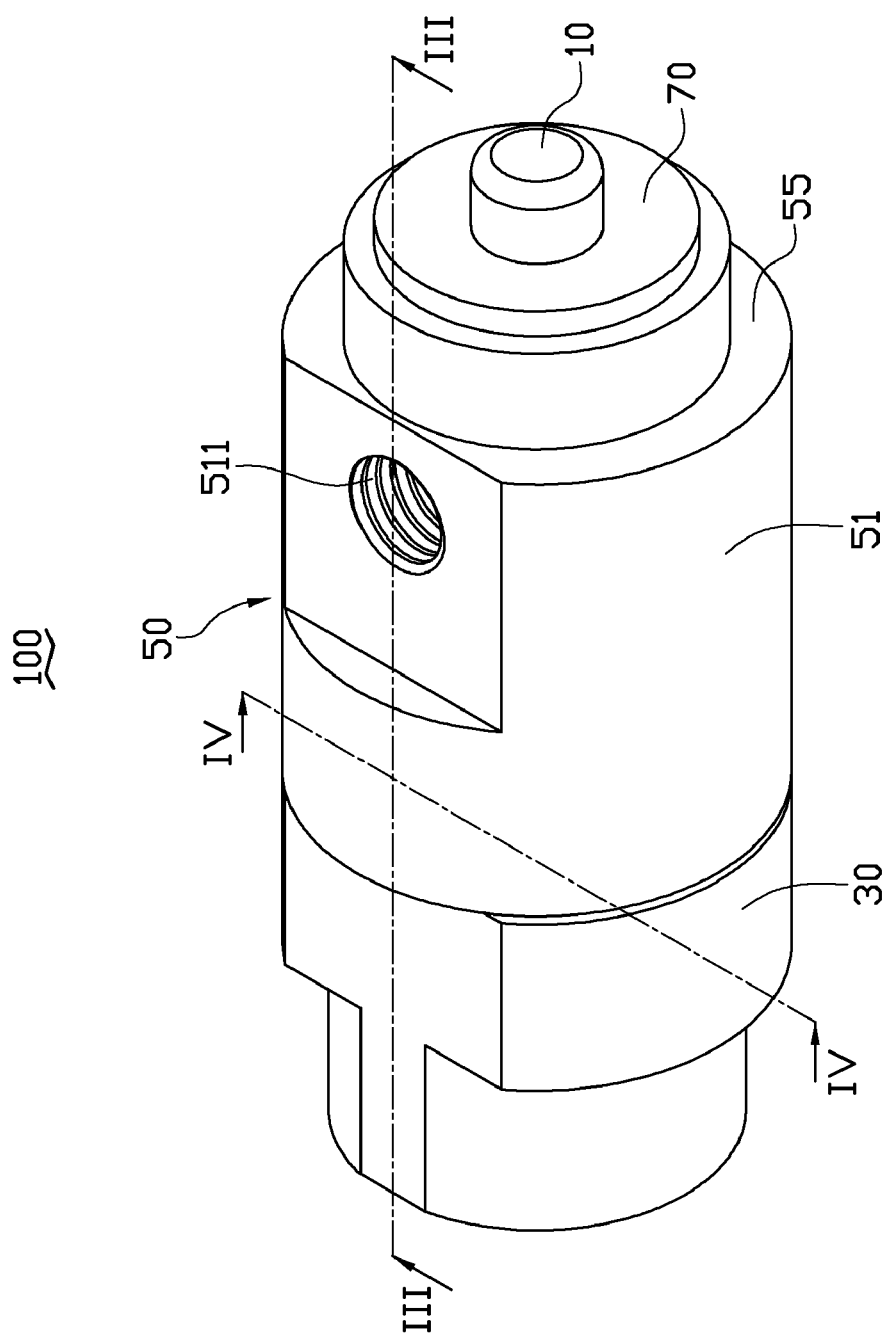
FIG. 1 is an isometric, assembled view of an embodiment of a hinge assembly as disclosed.

Referring to FIG. 1, an embodiment of a hinge assembly 100 applied in electronic devices such as mobile phones and personal digital assistants, includes a shaft 10, a rotary member 30, a tube 50, and a fastener 70.

Figure 2:
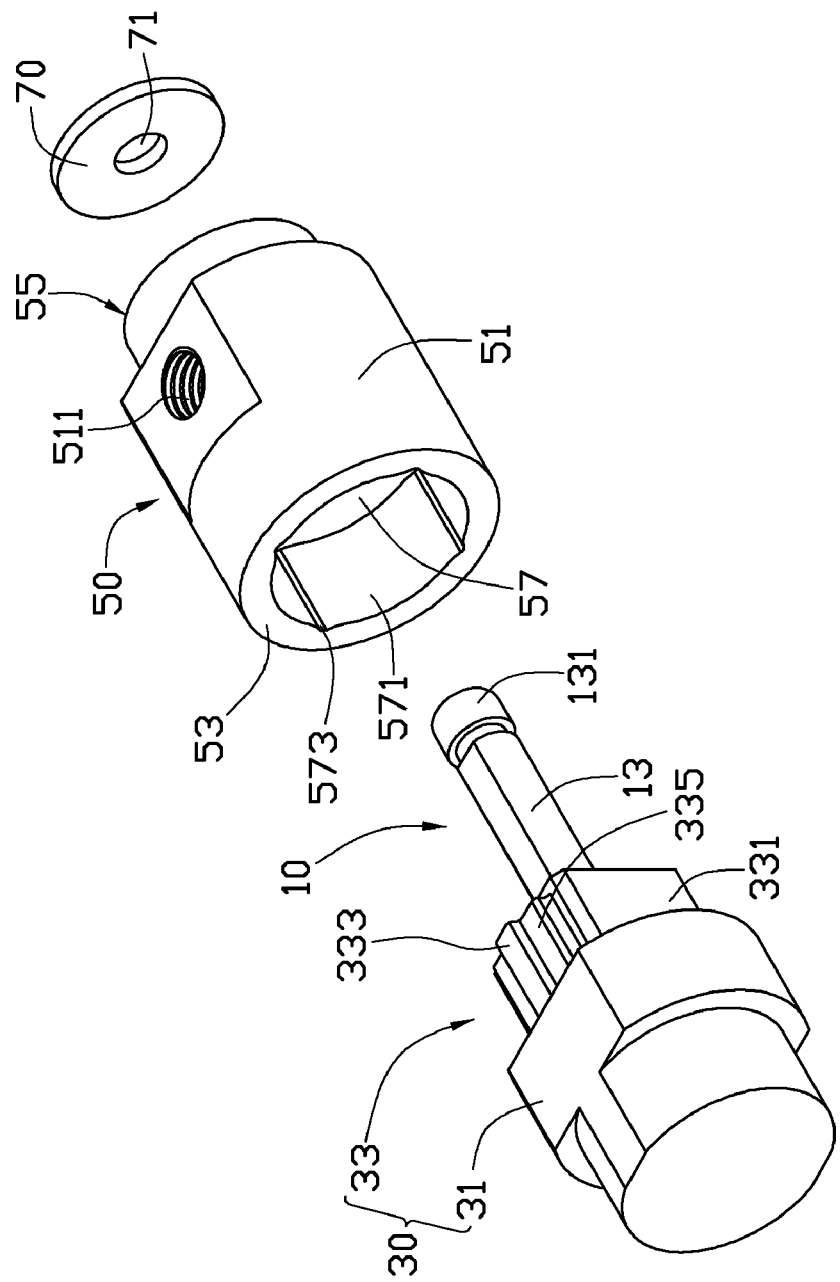
FIG. 2 is an isometric, exploded view of the hinge assembly of FIG. 1.
Figure 3:
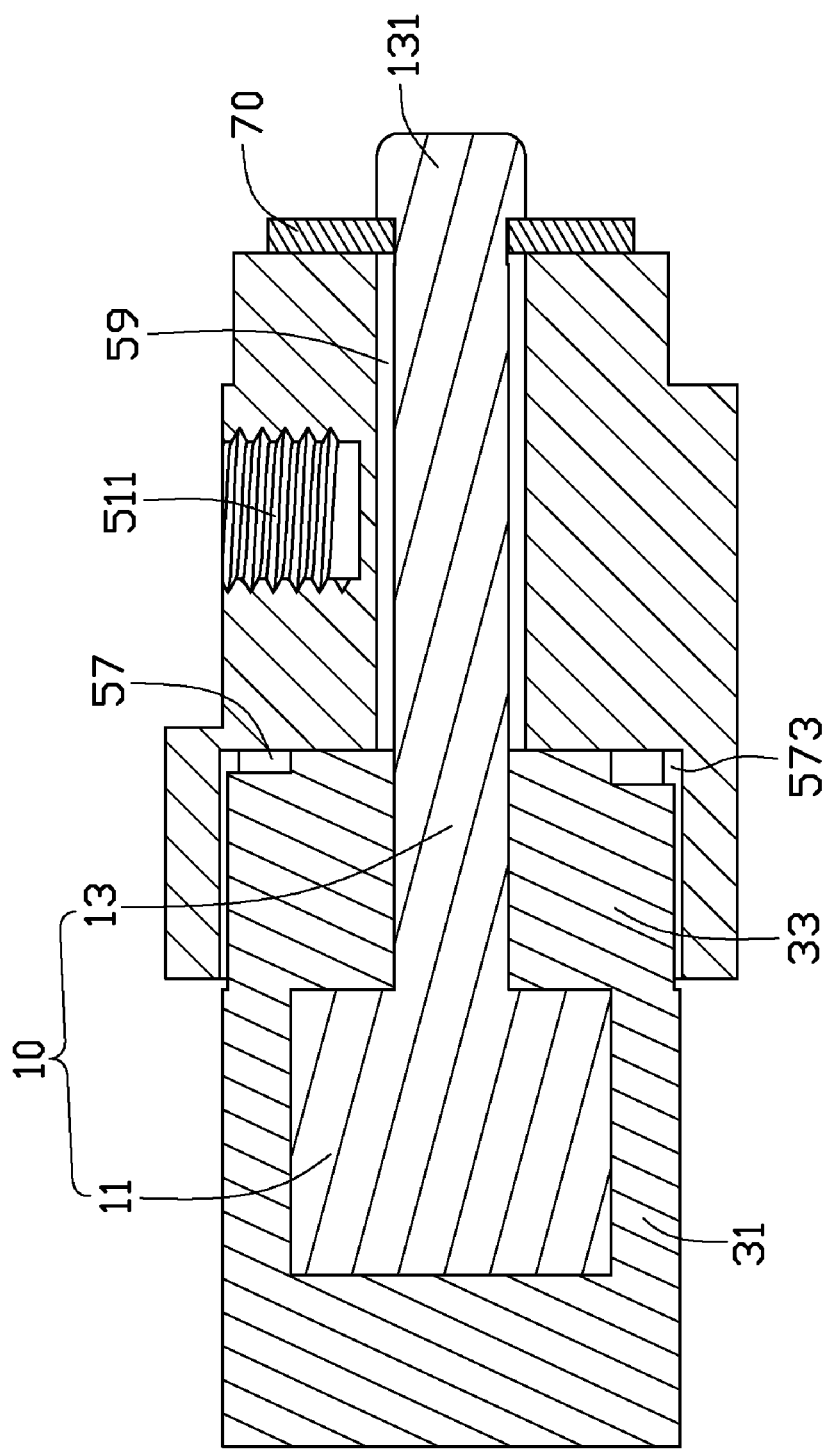
FIG. 3 is a cross-section of the hinge assembly taken along line III-III of FIG. 1.

Referring to FIG. 2 and FIG. 3, the shaft 10 includes a cap 11 and a shaft portion 13. The shaft portion 13 includes a latching portion 131 engaging with the fastener 70.

The rotary member 30 can be integrally formed with the shaft 10 by insert-molding. During manufacture, the shaft 10 is positioned in an injection mold, and melted plastic is injected thereinto. When the plastic is cooled and solidified, the rotary member 30 is formed, fixed to the shaft 10. The rotary member 30 includes a mounting portion 31 packaging a cap 11 of the shaft 10 and a friction body 33 packaging a part of the shaft portion 13. In use, the mounting portion 31 is fixed to a cover of an electronic device (not shown). The friction body 33 includes a main body 331, two friction portions 333 at opposite sides of the main body 331, and two connecting portions 335. Each connecting portion 335 protrudes from the main body 331 and each friction portion 333 protrudes from a corresponding connecting portion 335. That is, a distance between utmost points of the two friction portions 333 exceeds a distance between utmost points of the two connecting portions 335. The distance between utmost points of the two connecting portions 335 exceeds that between utmost points of the main body 331. In the illustrated embodiment, the friction portion 333 and the connecting portion 335 are substantially rectangular. The friction portions 333 and the connecting portions 335 are elastic, thus capable of deforming. In the illustrated embodiment, the entire rotary member 30 is deformable and elastic.

The tube 50 includes an outer surface 51, a first end surface 53, and a second end surface 55 opposite the first end surface 53. The tube 50 defines a circular receptacle 57 at the first end surface 53 and a shaft hole 59 at the second end surface 55. The receptacle 57 communicates with the shaft hole 59. The tube 50 defines a connecting hole 511 in the outer surface 51. The tube 50 is fixed to a main body (not shown) of the electronic device. The tube 50 may be fixed to the main body via the connecting hole 511. The tube 50 includes an inner sidewall 571 enclosing the receptacle 57. The inner sidewall 571 defines at least one positioning slot 573. In the illustrated embodiment, four positioning slots 573 are evenly arranged. A diameter of the receptacle 57 is slightly less than the distance between utmost points of the two friction portions 333 and substantially the same as or slightly less than the distance between utmost points of the two connecting portions 335. Alternatively, the receptacle 57 may have other shapes. The friction body 33 may also include one or more than two friction portions 333 and one or more than two connecting portions 335.

The fastener 70 is a closed ring having a latching hole 71 in which a latching portion 131 is riveted. After the latching portion 131 is riveted in the latching hole 71 by, for example, revolving-riveting, the latching hole 71 is slightly smaller than the latching portion 131.

Figure 4:
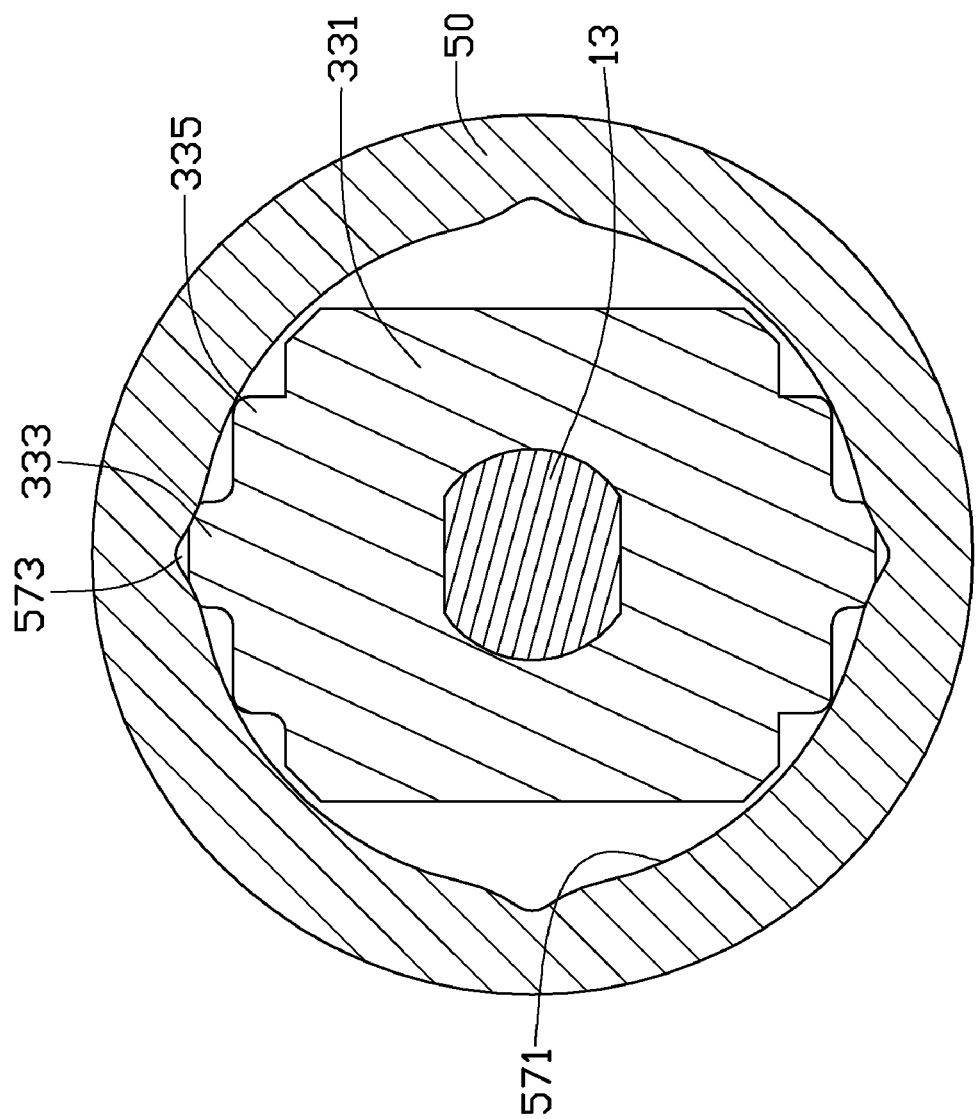
FIG. 4 is a cross-section of the hinge assembly taken along line IV-IV of FIG. 1.

Referring also to FIG. 4, during assembly of the hinge assembly 100, the shaft 10 is fixed to the rotary member 30 by insert-molding. The shaft portion 13 passes through the receptacle 57 and the shaft hole 59 of the tube 50, and the fastener 70 latches the shaft portion 13 to securely fix the tube 50 onto the shaft 10. The friction body 33 engages in the receptacle 57. The friction portions 333 deform to cause an interference fit with the inner sidewall 571 of the tube 50, since the diameter of the receptacle 57 is slightly less than the distance between utmost points of the two friction portions 333.

When the shaft 10 is rotated, the rotary member 30 rotates relative to the tube 50 accordingly. The friction portions 333 deform to resist the inner sidewall 571 of the tube 50. Friction generated between the friction portions 333 and the inner sidewall 571 enable retention of the shaft 10 in any position. That is, the hinge assembly 100 is self-retaining. When the friction portions 333 move to the positioning slots 573, the friction portions 333 reset somewhat, such that friction between the friction portions 333 and the inner sidewall 571 decreases. When the shaft 10 is rotated further so that the friction portions 333 pass the positioning slots 573, the friction increases. As such, it is apparent through a change in tension when the friction portions 333 reach the positioning slots 573, that the shaft 10 may be positioned in that position. It can be understood that the shaft 10 may retain different positions by changing positions of the positioning slots 573.

The hinge assembly 100 is self-retaining by engagement of the elastic friction body 33 and the tube 50, and simple in structure, facilitating ease of manufacture and assembly. The shaft 10 and the rotary member 30 can be integrally formed by insert-molding and can rotate together, reducing pressure on the shaft 10 such that the shaft 10 is small while satisfying strength requirements. Therefore, the hinge assembly 100 is correspondingly compact. The connecting portions 335 with height between the main body 331 and the friction portions 333 can reduce abrasion of the friction portions 333. Compared with other structures, the closed fastener 70 can more firmly latch with the shaft 10 and is not easily broken.

The fastener 70 may alternatively take the form of another member, such as a nut, or may even be omitted, in which case the end of the shaft 10 is riveted to the latching portion 131. The shaft 10 may be fixed to the rotary member 30 by other means such as by co-engaged latches. In use, the rotary member 30 may be fixed to the main body of the electronic device, and the tube 50 is fixed to the cover accordingly. The rotary member 30 may be inelastic and non-deformable; with, the tube 50 being elastic and deformable instead.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A hinge assembly, comprising:
   a shaft comprising a cap and a shaft portion;
   a rotary member fixed to the shaft, comprising a mounting portion packaging the cap of the shaft and a friction body packaging a part of the shaft portion; and
   a tube rotatably sleeved on the shaft portion of the shaft and engaging with the friction body of the rotary member;
   wherein an entirety of the rotary member is deformable and elastic, the friction body deforms when the tube rotates to a predetermined position relative to the rotary member, thereby generating friction between the friction body and the tube; the friction body comprises a rectangular main body, two rectangular friction portions formed at opposite sides of the rectangular main body, and two rectangular connecting portions, each of the two rectangular connecting portions protrudes from the rectangular main body, each of the two rectangular friction portions protrudes from each of the two rectangular connecting portions; a distance between utmost points of the two rectangular friction portions exceeds a distance between utmost points of the two rectangular connecting portions; the distance between utmost points of the two rectangular connecting portions exceeds a distance between utmost points of the rectangular main body.

2. The hinge assembly of claim 1, wherein the shaft and the rotary member are integrally formed by insert-molding.

3. The hinge assembly of claim 1, wherein the shaft further comprises a latching portion at an end opposite the cap, and the hinge assembly further comprises a fastener latching the latching portion of the shaft to fix the tube on the shaft.

4. The hinge assembly of claim 3, wherein the fastener is a closed ring riveted on an end of the shaft.

5. The hinge assembly of claim 1, wherein the tube comprises an inner sidewall, the inner sidewall defining at least one positioning slot engageable with at least one of the friction portions.

6. The hinge assembly of claim 5, wherein an inner diameter of the tube is slightly smaller than the distance between utmost points of the two friction portions and substantially the same as or slightly smaller than the distance between utmost points of the two connecting portions.

7. A hinge assembly, comprising:
   a shaft comprising a cap and a shaft portion;
   a rotary member fixed to the shaft, comprising a mounting portion packaging the cap of the shaft and a friction body packaging a part of the shaft portion; and
   a tube rotatably sleeved on the shaft portion of the shaft and engaging with the friction body of the rotary member;
   wherein at least part of the rotary member or at least part of the tube is deformable, such that the rotary member and the tube are capable of elastically engaging engage with each other, thereby generating friction between the rotary member and the tube to position the rotary member relative to the tube; the friction body comprises a rectangular main body, two rectangular friction portions formed at opposite sides of the rectangular main body, and two rectangular connecting portions, each of the two rectangular connecting portions protrudes from the main body and each of the two rectangular friction portions protrudes from each of the two rectangular connecting portions; a distance between utmost points of the two rectangular friction portions exceeds a distance between utmost points of the two rectangular connecting portions; the distance between utmost points of the two rectangular connecting portions exceeds a distance between utmost points of the rectangular main body.

8. The hinge assembly of claim 7, wherein the rotary member is plastic and deformable.

9. The hinge assembly of claim 8, wherein the shaft and the rotary member are integrally formed by insert-molding.

10. The hinge assembly of claim 7, wherein the shaft further comprises a latching portion at an end thereof opposite the cap; the hinge assembly further comprises a fastener latching the latching portion of the shaft to fix the tube on the shaft.

11. The hinge assembly of claim 7, wherein the tube comprises an inner sidewall, the inner sidewall defining at least one positioning slot engageable with at least one of the friction portions.

* * * * *